United States Patent
Popek et al.

(10) Patent No.: US 12,500,488 B2
(45) Date of Patent: Dec. 16, 2025

(54) ELECTRICAL MACHINE

(71) Applicant: Hamilton Sundstrand Corporation, Charlotte, NC (US)

(72) Inventors: Grzegorz Ryszard Popek, Birmingham (GB); Mital Shah, Harrow (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 227 days.

(21) Appl. No.: 18/342,299

(22) Filed: Jun. 27, 2023

(65) Prior Publication Data
US 2024/0022143 A1 Jan. 18, 2024

(30) Foreign Application Priority Data
Jul. 18, 2022 (EP) .................................... 22185431

(51) Int. Cl.
| | |
|---|---|
| H02K 1/276 | (2022.01) |
| H02K 3/28 | (2006.01) |
| H02K 11/33 | (2016.01) |
| H02P 27/06 | (2006.01) |
| H02P 101/30 | (2015.01) |

(52) U.S. Cl.
CPC ............... *H02K 11/33* (2016.01); *H02K 3/28* (2013.01); *H02P 27/06* (2013.01); *H02K 2213/06* (2013.01); *H02P 2101/30* (2015.01)

(58) Field of Classification Search
CPC .......... H02K 1/276; H02K 11/33; H02K 3/28; H02K 2213/06; H02P 27/06; H02P 2101/30; H02P 25/024
See application file for complete search history.

(56) References Cited

U.S. PATENT DOCUMENTS

| | | | |
|---|---|---|---|
| 8,587,234 B2 | 11/2013 | Villwock et al. | |
| 10,135,383 B2 | 11/2018 | Koenig et al. | |
| 11,165,379 B2 | 11/2021 | Freire | |
| 2012/0139454 A1 | 6/2012 | Roessler et al. | |

(Continued)

FOREIGN PATENT DOCUMENTS

| | | |
|---|---|---|
| CN | 106324415 A | 1/2017 |
| WO | 2014162156 A1 | 10/2014 |

OTHER PUBLICATIONS

Abstract of CN106324415 (A), Published: Jan. 11, 2017, 1 page.
(Continued)

*Primary Examiner* — Cortez M Cook
(74) *Attorney, Agent, or Firm* — CANTOR COLBURN LLP

(57) ABSTRACT

An electrical machine includes a first set of windings, a second set of windings and a power controller connected to the first set of windings by a first set of feeder cables. The power controller controls the current and/or voltage supplied to the first set of windings at a control frequency and generates a test signal to supply to the first set of windings. The test signal has one or more frequency components having a frequency that is significantly higher than the control frequency. The test signal in the first set of windings generates an electromagnetic field that induces a current or voltage in the second set of windings. The power controller includes a detector connected to the second set of windings by a second set of feeder cables. The detector measures the voltage and/or current response of the induced current or voltage.

15 Claims, 1 Drawing Sheet

(56) References Cited

U.S. PATENT DOCUMENTS

2012/0187893 A1* 7/2012 Baba ................ H02P 25/024
 318/722
2016/0072416 A1* 3/2016 Hirotani ............ H02K 1/276
 318/400.2

OTHER PUBLICATIONS

European Search Report for Application No. 22185431.8, mailed Dec. 9, 2022, 20 pages.
Xie, et al. "Modeling and Verification of Electrical Stress in Inverter-Driven Electric Machine Windings" IEEE Transactions on Industry Applications, vol. 55, No. 6, Nov./Dec. 2019, 12 pages.

* cited by examiner

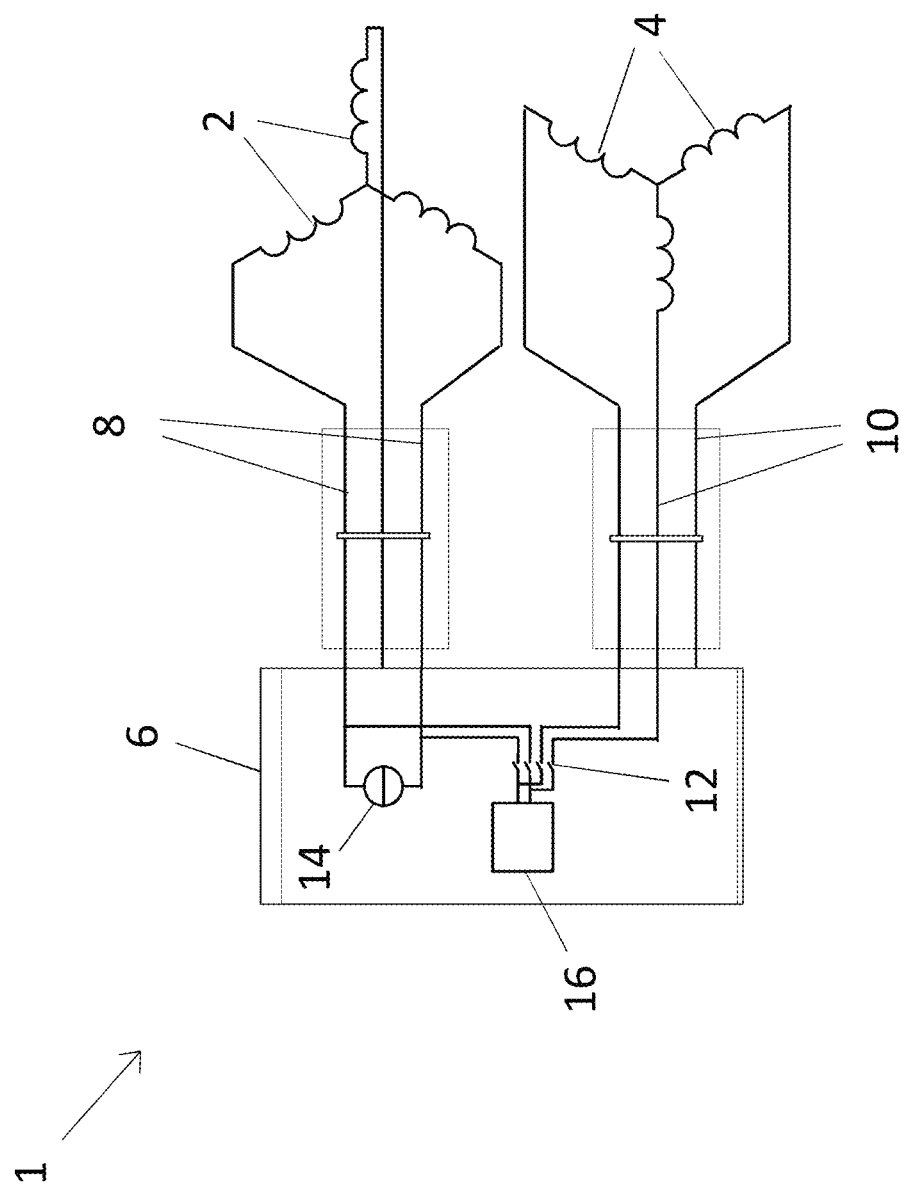

ELECTRICAL MACHINE

CROSS REFERENCE TO RELATED APPLICATION

This application claims priority to European Patent Application No. 22185431.8 filed Jul. 18, 2022, the entire contents of which is incorporated herein by reference.

FIELD

The present disclosure relates to an electrical machine and a method of performing diagnostics on an electrical machine.

BACKGROUND

Dual wound electrical machines are used for a number of purposes, e.g. in aircraft. Dual wound fault tolerant motors may be provided in safety critical systems, e.g. for primary flight controls in aircraft. They may also be used to provide power dense high power motors for electric propulsion systems or in aircraft generators.

Such electrical machines experience ageing over their lifetime, e.g. owing to degradation of the windings, the interconnections and the insulation. It is therefore important to monitor the ageing of such electrical machines.

It is desired to provide an electrical machine that has an improved monitoring and diagnostic capability.

SUMMARY

In accordance with an aspect of the disclosure, there is provided an electrical machine. The machine includes: a first set of windings; a second set of windings; and a power controller connected to the first set of windings by a first set of feeder cables. The power controller is arranged to control the current and/or voltage supplied to the first set of windings via the first set of feeder cables at a control frequency. The power controller is further arranged to generate a current and/or voltage test signal to supply to the first set of windings via the first set of feeder cables. The current and/or voltage test signal comprises one or more frequency components having a frequency that is significantly higher than the control frequency. The first set of windings is arranged such that the test signal causes the first set of windings to generate an electromagnetic field, and the first set of windings and the second set of windings are arranged relative to each other such that the electromagnetic field generated by the first set of windings induces a current or voltage in the second set of windings. The power controller comprises: a detector connected to the second set of windings by a second set of feeder cables. The detector is arranged to measure the voltage and/or current response of the current or voltage induced in the second set of windings.

In accordance with another aspect of the disclosure, there is provided a method of performing diagnostics on an electrical machine, The machine includes: a first set of windings; a second set of windings; a power controller connected to the first set of windings by a first set of feeder cables; and a detector connected to the second set of windings by a second set of feeder cables. The method includes: the power controller controlling the current and/or voltage supplied to the first set of windings via the first set of feeder cables at a control frequency; and the power controller generating a current and/or voltage test signal and supplying the test signal to the first set of windings via the first set of feeder cables. The current and/or voltage test signal comprises one or more frequency components having a frequency that is significantly higher than the control frequency. The first set of windings is arranged such that the test signal causes the first set of windings to generate an electromagnetic field and the first set of windings and the second set of windings are arranged relative to each other such that the electromagnetic field generated by the first set of windings induces a current or voltage in the second set of windings. The method also includes the detector measuring the voltage and/or current response of the current or voltage induced in the second set of windings.

Thus the disclosure provides an electrical machine and a method of performing diagnostics on an electrical machine. The electrical machine has two sets of windings (i.e. is double wound) that are arranged (e.g. located and operated) relative to each other such that they are electromagnetically coupled. Thus, when the first set of windings is operated by the power controller, and a test signal is injected along the first set of feeder cables, the resultant electromagnetic field generated by the first set of windings in response to the test signal couples to the second set of windings.

This electromagnetic field experienced by the second set of windings induces a current or voltage in the second set of windings, which can then be measured by the detector (whether current or voltage is induced and detected may depend on the impedance of the detector). Thus, the first set of windings may be operated in a "transmit" (or "excitation") mode of operation and the second set of windings may be operated in a "receive" (or "detection") mode of operation.

The response of the second set of windings to the electromagnetic field generated from the test signal may be used to provide a measure of the electromagnetic coupling between the first and second sets of windings. The coupling may change, e.g. owing to notches or cracks in the conductors of the windings and/or changes in the insulation of the windings, and may thus be used to give an indication of the condition of the electrical machine. If such measurements are taken over time, the deterioration of the electrical machine may be monitored.

Owing to the coupling between the first and second sets of windings being electromagnetic in nature, the electrical machine may have the ability to measure ageing effects (e.g. deterioration of the windings) related to the energy transfer between the first and second sets of windings, in addition to effects relating to changes in the capacitance.

The electrical machine has a first set of windings and a second set of windings. That is, the electrical machine comprises a multi-channel (e.g. double wound) electrical machine. In embodiments the first set of windings and the second set of windings are arranged to be controlled independently of each other, e.g. each controlled by the power controller independently.

Thus, in embodiments, the power controller is connected to the second set of windings by the second set of feeder cables, wherein the power controller is arranged to control the current and/or voltage supplied to the second set of windings via the second set of feeder cables, e.g. at the control frequency. In this way, both the first and second sets of windings may be used to control (e.g. power) the electrical machine, e.g. independently.

In embodiments, e.g. during diagnostic operation of the electrical machine, the first set of windings and the second set of windings are (e.g. only) (electrically) connected to each other via the respective ends of the first set of feeder cables and the second set of feeder cables that are proximal to the power controller. That is, in embodiments, the first set of windings and the second set of windings are not directly connect to each other, only via the (lengths of the) first set of feeder cables and the second set of feeder cables.

In a set of embodiments the first set of windings is connected (via the first and second sets of feeder cables) in parallel with the second set of windings. In embodiments, the power controller is arranged to operate the first set of windings and the second set of windings independently. The electrical machine may, in embodiments, comprise further (e.g. third, fourth) sets of windings that are arranged to be controlled independently of each other, e.g. each controlled by the power controller independently.

The electrical machine may comprise any suitable and desired type of electrical machine, such as an electrical motor or generator, e.g. operating synchronously or asynchronously.

The first and second sets of windings may comprise any suitable and desired type of windings, e.g. concentrated windings. In embodiments, the first set of windings and/or the second set of windings comprise distributed windings.

The first and second sets of windings may be arranged in the electrical machine in any suitable and desired way, e.g. such that they are electrically separate from each other (and thus have no direct electrical connections between them). In embodiments, the electrical machine comprises a rotor and a stator, wherein the first set of windings and the second set of windings are each arranged on the stator. In embodiments, the stator comprises a stator core and the first set of windings and the second set of windings are each arranged on the (same) stator core.

The first and second sets of windings may be arranged on (share) the same slots of the stator core. In embodiments, the first set of windings and the second set of windings are rotationally spaced from each other (e.g. on the stator core), e.g. by degrees.

The (e.g. first and second sets of windings of the) electrical machine may (each) comprise (and be operated as) a plurality of (e.g. three) phases.

The power controller, which is connected to the first set of windings by the first set of feeder cables, may comprise and suitable and desired type of power controller. In embodiments, the power controller comprises a power converter, e.g. a generator control unit or a motor drive electronics unit.

When the power controller is arranged to operate the first set of windings and the second set of windings independently, the power controller may comprise a first power converter arranged to control first set of windings and a second power converter arranged to control the second set of windings (e.g. to control the current and/or voltage supplied via the feeder cables). Thus the first and second power converters may control the first and second set of windings independently of each other.

When the power controller comprises a motor drive electronics unit, the power converter may supply control currents that are fed to the first and/or second windings for generating a desired mission profile (e.g. of speed and/or torque).

When the power controller comprises a generator control unit, the power converter may control the back EMF of the electrical machine, e.g. to create an AC power grid with a stable voltage (e.g. for an aircraft). This may be achieved by suppling active or reactive power to control the electrical machine's terminal voltages. When the power controller comprises a generator control unit, the power converter may operate as a passive or active rectifier, e.g. to produce a stable DC power grid (e.g. for an aircraft).

The (e.g. power converter of the) power controller may be arranged to operate the electrical machine as both a motor and a generator, e.g. switching between these operations at different times.

As will be understood, the power controller is used to control normal operation of the electrical machine, by controlling the current and/or voltage supplied to the first (and, e.g., second) set of windings. This may be used, for example, to generate rotational movement of a rotor relative to a stator of the electrical machine. In addition to controlling normal operation of the electrical machine, the power controller is also arranged to generate a current and/or voltage test signal to supply to the first set of windings via the set of feeder cables.

The power controller may generate the test signal, comprising the high frequency component(s), in any suitable and desired way. In embodiments, the power controller is arranged to generate the test signal by modulating the current and/or voltage supplied to the first set of windings, e.g. a high frequency modulation of the current and/or voltage supplied to the first set of windings. Thus, the power controller may be arranged to superimpose the test signal on the current and/or voltage ordinarily supplied to the first set of windings for normal operation of the electrical machine.

In embodiments, the test signal comprises a sinusoidal wave, wherein the sinusoidal wave has a frequency that is significantly higher than the control frequency. Thus, in embodiments, the power controller is arranged to generate a sinusoidal wave having a frequency that is significantly higher than the control frequency.

The power controller may be arranged to generate the sinusoidal wave in any suitable and desired way. In embodiments, the power controller comprises a low voltage electromagnetic system, such as a dedicated circuit, arranged to generate the sinusoidal wave. In embodiments, the power controller comprises a frequency generator, arranged to generate the sinusoidal wave.

The frequency of the sinusoidal wave may be any suitable and desired frequency that is significantly higher than the control frequency. The frequency of the sinusoidal wave may be fixed (constant). In embodiments, the power controller is arranged to vary the frequency of the sinusoidal wave. The power controller may be arranged to vary the frequency of the sinusoidal wave by sweeping the frequency of the sinusoidal wave (varying the frequency smoothly across a range of frequencies, i.e. between a lower frequency and an upper frequency). This helps to provide multiple different frequencies in the test signal.

In embodiments, the test signal comprises a step function, wherein the step function comprises one or more frequency components having a frequency that are significantly higher than the control frequency. It will be appreciated that a step function contains a wide range of (e.g. Fourier component) frequencies that include high frequencies. This helps to provide multiple different frequencies in the test signal, with the multiple different frequencies being provided at the same time, e.g. in contrast to a swept sinusoidal wave. It will also be appreciated that a step function is a single event that is relatively easy to generate.

The power controller may be arranged to generate the step function in any suitable and desired way. In embodiments, the power controller comprises a power bridge and/or inverter(s) arranged to generate the step function. For example, inverter(s) in the (e.g. power bridge of the) power controller could be arranged to produce edges for generating a step function, e.g. by toggling (e.g. MOSFET) switches in the inverter. The power controller may, in embodiments, comprise discrete (e.g. silicon) devices, a transformer arrangement or a capacitive arrangement arranged to generate the step function.

When the first (and, e.g., second) set of windings comprises a plurality of phases, the power controller may be arranged to generate the step function by controlling (e.g. toggling) the switches (e.g. MOSFETs) that connect the phases to the power controller. Thus, in embodiments, the electrical machine a (respective) plurality of switches connecting the power controller to the plurality of phases.

The test signal has a frequency (or one or more frequency components) that is significantly greater than the control frequency. At such control frequencies, e.g. less than 1 kHz (e.g. a few Hz), there is little electromagnetic coupling between the first set of windings and the second set of windings.

In embodiments, (e.g. at least one or more of) the (one or more components of the) test signal (each) has a frequency such that the test signal (when supplied to the first set of windings) does not cause a torque (or only causes a negligible torque) to be generated (e.g. on the rotor) in the electrical machine, e.g. the (each) frequency is greater than frequencies that would cause a torque to be generated.

In embodiments, (e.g. at least one or more of) the (one or more components of the) test signal (each) has a frequency greater than 1 MHz, e.g. greater than 5 MHz, e.g. greater than 10 MHz.

In embodiments, (e.g. at least one or more of) the (one or more components of the) test signal (each) has a frequency such that the test signal (when supplied to the first set of windings along the first set of feeder cables) does not cause the first set of feeder cables to operate as a transmission line, e.g. the (each) frequency is less than the frequencies that would cause the first set of feeder cables to operate as a transmission line.

In embodiments, (e.g. at least one or more of) the (one or more components of the) test signal (each) has a frequency less than 100 MHz, e.g. less than 50 MHz, e.g. less than 20 MHz.

The frequency at which transmission line effects become noticeable depends on the length of the feeder cables. In the embodiments in which the test signal comprises a step function, the rise time (and thus the frequencies of the frequency components) depends on the length of the feeder cables. However, if the step function is generated by an inverter, the switches in the inverter may be relatively fast.

The frequency or frequencies of the test signal may thus be chosen based on the length of the feeder cables, or vice versa. In embodiments, the feeder cables have a length between 1 m and 35 m, e.g. between 5 m and 25 m, e.g. between 10 m and 15 m.

The test signal in the first set of windings generates an electromagnetic field that induces a current or voltage in the second set of windings. That is, the first set of windings and the second set of windings have a mutual electromagnetic coupling between them, when the electrical machine is operating and the test signal is supplied to the first set of windings, such that the input of the test signal in the first set of windings excites a response in the second set of windings.

Thus, the first set of windings and the second set of windings are arranged relative to each other such that the electromagnetic field generated by the first set of windings extends into (e.g. penetrates) the second set of windings. For example, as outlined above, the first and second sets of windings may form part of the same stator. Thus, while the first and second sets of windings may be electrically separate from each other, in embodiments they are spatially close to each other.

The detector, which is connected to second set of windings by a second set of cables, may comprise any suitable and desired type of detector for measuring the voltage and/or current response (at the detector) of the current or voltage induced in the second set of windings. For example, the detector may comprise a low impedance detector arranged to measure the current response, or the detector may comprise a high impedance detector arranged to measure the voltage response. The detector is connected to second set of windings via the second set of cables, so the response induced in the second set of windings returns to the detector via the second set of cables.

The detector may be arranged to measure the same variable that was used for the test signal supplied to the first set of windings and/or used for controlling the first set of windings. Thus, if the test signal comprises a current test signal and/or the power controller controls the current supplied to the first set of windings, the detector may be arranged to measure the current response at the detector. Similarly, if the test signal comprises a voltage test signal and/or the power controller controls the voltage supplied to the first set of windings, the detector may be arranged to measure the voltage response at the detector.

In embodiments, the (e.g. detector of the) electrical machine is arranged to determine the power transferred between the first set of windings and the second set of windings, e.g. from the current and/or voltage measured by the detector, when the electromagnetic field generated by the first set of windings induces a current or voltage in the second set of windings. This may be used to monitor the ageing of the electrical machine.

In embodiments, the (e.g. detector of the) electrical machine is arranged to determine the power transferred between the first set of windings and the second set of windings, e.g. from the current and/or voltage measured by the detector, as a function of the frequency of the test signal, when the electromagnetic field generated by the first set of windings induces a current or voltage in the second set of windings. This may be used to monitor the ageing of different parts of the electrical machine.

In embodiments the detector may operate as an impedance, e.g. for vector network analyser. For example, the detector may comprise a vector network analyser and/or a digital power monitor. The detector, such as this, may be arranged to determine the current and/or voltage measured by the detector, e.g. as a function of time or frequency.

The detector may be arranged to compare the current and/or voltage measured by the detector with the current and/or voltage of the test signal, e.g. as a function of frequency.

The detector may be arranged to compare (and the method may comprise comparing) the current and/or voltage measured by the detector at a first time with the current and/or voltage measured by the detector at a second, later time. This may allow changes in the response of the second set of windings to the test signal to be monitored, e.g. as a function of time, which may allow changes in the condition of the electrical machine to be determined. The (e.g. change in) response may depend on whether the change in the condition of the electrical machine is inductive or resistive in nature, for example, as a result of the ageing of the components.

The detector may be arranged to measure the current and/or voltage in any suitable and desired way. For example, the detector may be arranged to measure one or more of the amplitude, the frequency and the phase of the current and/or voltage (from either or both of the test signal supplied by the power controller to the first set of windings via the first set of feeder cables and the measured response at the detector of the current or voltage induced in the second set of windings (via the second set of feeder cables)).

The detector may be arranged to compare (and the method may comprise comparing) such measurements taken at first and second times, or taken for the test signal and the detected response, which allows changes in the amplitude, frequency and/or phase of the measured response to be determined. Measuring, inter alia, the amplitude and phase may allow a full body plot to be constructed, which may help capacitive and resistive losses to be identified, owing to the change in phase(s).

The (e.g. detector of the) electrical machine may be arranged to process any of the measurements described herein (or differences therebetween), e.g. using signal processing, frequency processing, artificial intelligence learning. For example, differences between the test signal and the measured response, e.g. in the time domain, may be processed in this way.

When the first (and, e.g., second) set of windings comprises a plurality of phases, the detector may be arranged to make any of the measurements described herein for the plurality of phases either individually, together or between any combination of the phases (e.g. by toggling switches that connect the phases to the power controller and/or the detector).

The (e.g. detector of the) electrical machine may be arranged to output one or more graphs of the measurements (e.g. as described herein) made by the detector. For example, the amplitude of the measured current and/or voltage may be plotted against the frequency of the current and/or voltage. This may allow different geometrical features (e.g. slots of the stator) of the electrical machine to be identified and their condition assessed.

BRIEF DESCRIPTION OF DRAWINGS

An embodiment will now be described, by way of example only, and with reference to the accompanying drawing in which:

FIG. 1 shows an embodiment of an electrical machine in accordance with the present disclosure.

DETAILED DESCRIPTION

Dual wound electrical machines are used, e.g. in aircraft, for a number of purposes. This may be in safety critical systems or high power motors, for example. An embodiment of such a dual wound electrical machine will now be described.

FIG. 1 discloses a double wound electrical machine (e.g. motor) 1 in accordance with an embodiment of the present disclosure. The machine 1 comprises a first set of windings 2, having three phases and a second set of windings 4, also having three phases. The first and second set of windings 2, 4 are arranged on a common stator, e.g. about a rotor of the electrical machine 1.

The first and second set of windings 2, 4 may either share the same slots on the stator or be spaced from each other, e.g. by 60 degrees (e.g. for each phase). Shifting the sets of windings from each other helps to electrically separate the first and second set of windings 2, 4 from each other, for fundamental frequencies (and some fault conditions).

The electrical machine 1 also comprises a power converter 6 that is connected to the first set of windings 2 by a first set of feeder cables 8 and to the second set of windings 4 by a second set of feeder cables 10. A set of switches 12 is used to electrically connect the second set of windings 4 to the power converter 6.

The power converter 6 is arranged to control the current and voltage supplied to the first and second sets of windings 2, 4 via the first and second sets of feeder cables 8, 10 respectively. For simplicity, FIG. 1 shows only a single power channel, with detection occurring in a second channel. In some embodiments, the electrical machine may comprise two separate power converters, one arranged to control the current and voltage supplied to the first sets of windings and one arranged to control the current and voltage supplied to the second sets of windings. Thus, the power converter 6 shown in FIG. 1 may comprise two inverters that are arranged to control the first and second sets of windings 2, 4 independently.

The power converter 6 comprises a frequency generator 14 arranged to generate a test signal that can be supplied to the first set of windings 2, along with the control current and voltage that the power converter 6 controls.

The power converter 6 also comprises a detector 16 that is connected to the second set of windings 4 by the second set of feeder cables 10. The detector 16 is also connected to the frequency generator 14 via the set of switches 12.

Operation of the electrical machine 1 shown in FIG. 1 will now be described.

The electrical machine (e.g. motor) 1 is operated normally, by the power converter 6 controlling the current and voltage supplied to the first and/or second sets of windings 2, 4 via the first and second sets of feeder cables 8, 10 respectively. The electromagnetic field generated by the stator causes the rotor to rotate, to operate the electrical machine 1.

The frequency generator 14 of the power converter 6 is used to generate a test signal that is superimposed on the (normal control) current and voltage supplied to the first second set of windings 2 via the first set of feeder cables 8. The test signal is a sinusoidal signal having a frequency in a frequency range that is significantly greater than the operating frequency of the (normal control) current and voltage supplied to the first set of windings 2, and that is less than the frequency at which transmission line effects in the first set of feeder cables 8 starts to emerge, e.g. between 1 MHz and 100 MHz. The sinusoidal test signal may be generated at a constant frequency or may be swept through a range of frequencies.

In other embodiments, the power converter 6 is used to generate a test signal that comprises a step function. This contains a wide range of (e.g. Fourier component) frequencies that include high frequencies, which provides multiple different frequencies in the test signal.

The test signal, when it passes into the first set of windings 2, generates an electromagnetic field that penetrates into the second set of windings 4. This electromagnetic field couples to the second set of windings 4, inducing a current or voltage in the second set of windings 4. This couples the first set of windings 2 to the second set of windings 4 and transfers energy from the first set of windings 2 to the second set of windings 4.

The current or voltage induced in the second set of windings 4 flows along the second set of feeder cables 10, where it is measured by the detector 16. The measurement of the current allows a measure of the energy that has been transferred from the first set of windings 2 to the second set of windings 4 to be determined.

The set of switches 12 allow the detector 16 to be electrically connected to the frequency generator 14, thus allowing the detector to measure the input signal that is supplied to the first set of windings 2. This allows the response of the second set of windings 4 (i.e. the energy transferred from the first set of windings 2 to the second set of windings 4) to be compared to the input signal.

The set of switches 12 can also be controlled to connect different combinations of phases of the first set of windings 2 and the second set of windings 4, such that the energy transfer between different combinations of phases of the first set of windings 2 and the second set of windings 4 may be determined.

The energy transferred between the first set of windings 2 and the second set of windings 4, is a measure of the condition of the electrical machine 1, as is the comparison with the input signal that is supplied to the first set of windings 2. For example, as the electrical machine ages, the energy transfer between the first set of windings 2 and the second set of windings 4 changes, e.g. proportionally to the deterioration of the material of the electrical machine 1.

For example, notches or cracks in the copper windings, which may develop as the electrical machine 1 ages, affects the amount of energy that is transferred between the first set of windings 2 and the second set of windings 4. This is due to skin effects from the relatively high frequency of the test signal that travels on the surface of the conducting part of the first set of windings 2 and the second set of windings 4, causing power to be lost at a defect.

The energy transfer is also affected by changes in the insulation around the first set of windings 2 and the second set of windings 4. Changes in the dielectric constant of the insulation, e.g. owing to degradation of the insulation as the electrical machine 1 ages, may result in less energy being transferred between the first set of windings 2 and the second set of windings 4.

It can be seen from the above that, in embodiments, the electrical machine may be used to monitor its health prognostics and diagnostics. This may include tracking the ageing of the insulation of the electrical machine, tracking the ageing of the windings (e.g. the health of the conductors) and tracking the condition of the interconnections in the cables.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electrical machine comprising:
    a first set of windings;
    a second set of windings;
    a power controller connected to the first set of windings by a first set of feeder cables;
    wherein the power controller is arranged to control the current and/or voltage supplied to the first set of windings via the first set of feeder cables at a control frequency;
    wherein the power controller is further arranged to generate a current and/or voltage test signal to supply to the first set of windings via the first set of feeder cables;
    wherein the current and/or voltage test signal comprises one or more frequency components having a frequency that is significantly higher than the control frequency;
    wherein the first set of windings is arranged such that the test signal causes the first set of windings to generate an electromagnetic field;
    wherein the first set of windings and the second set of windings are arranged relative to each other such that the electromagnetic field generated by the first set of windings induces a current or voltage in the second set of windings;
    wherein the power controller comprises:
        a detector connected to the second set of windings by a second set of feeder cables;
        wherein the detector is arranged to measure the voltage and/or current response of the current or voltage induced in the second set of windings;
        wherein the first set of windings and the second set of windings are connected to each other via the respective ends of the first set of feeder cables and the second set of feeder cables that are proximal to the power controller.

2. The electrical machine as claimed in claim 1, wherein the electrical machine comprises a rotor and a stator, wherein the first set of windings and the second set of windings are each arranged on the stator.

3. The electrical machine as claimed in claim 1, wherein the power controller comprises a power converter.

4. The electrical machine as claimed in claim 3, wherein the power controller comprises a power converter is a generator control unit or a motor drive electronics unit.

5. The electrical machine as claimed in claim 1, wherein the power controller is arranged to generate the test signal by modulating the current and/or voltage supplied to the first set of windings.

6. The electrical machine as claimed in claim 1, wherein the power controller is arranged to generate a sinusoidal wave as the test signal, wherein the sinusoidal wave has a frequency that is significantly higher than the control frequency.

7. The electrical machine as claimed in claim 6, wherein the power controller is arranged to vary the frequency of the sinusoidal wave.

8. The electrical machine as claimed in claim 1, wherein the power controller is arranged to generate a step function as the test signal, wherein the step function comprises one or more frequency components having a frequency that are higher than the control frequency.

9. The electrical machine as claimed in claim 8, wherein the power controller comprises a power bridge and/or inverter(s) arranged to generate the step function.

10. The electrical machine as claimed in claim 9, wherein the first set of windings comprises a plurality of phases, wherein the electrical machine comprises a plurality of switches connecting the power controller to the plurality of phases, and wherein the power controller is arranged to generate the step function by controlling the switches that connect the plurality of phases to the power controller.

11. The electrical machine as claimed in claim 1, wherein the test signal has a frequency greater than 1 MHz.

12. The electrical machine as claimed claim 11, wherein the test signal has a frequency less than 100 MHz.

13. An electrical machine comprising:
   a first set of windings;
   a second set of windings;
   a power controller connected to the first set of windings by a first set of feeder cables;
   wherein the power controller is arranged to control the current and/or voltage supplied to the first set of windings via the first set of feeder cables at a control frequency;
   wherein the power controller is further arranged to generate a current and/or voltage test signal to supply to the first set of windings via the first set of feeder cables;
   wherein the current and/or voltage test signal comprises one or more frequency components having a frequency that is significantly higher than the control frequency;
   wherein the first set of windings is arranged such that the test signal causes the first set of windings to generate an electromagnetic field;
   wherein the first set of windings and the second set of windings are arranged relative to each other such that the electromagnetic field generated by the first set of windings induces a current or voltage in the second set of windings;
   wherein the power controller comprises:
      a detector connected to the second set of windings by a second set of feeder cables;
      wherein the detector is arranged to measure the voltage and/or current response of the current or voltage induced in the second set of windings;
   wherein the electrical machine is arranged to determine the power transferred between the first set of windings and the second set of windings, when the electromagnetic field generated by the first set of windings induces a current or voltage in the second set of windings.

14. The electrical machine as claimed in claim 1, wherein the detector is arranged to measure one or more of the amplitude, the frequency and the phase of the current and/or voltage response of the current or voltage induced in the second set of windings.

15. A method of performing diagnostics on an electrical machine as recited in claim 1 wherein the method comprises:
   controlling the current and/or voltage supplied to the first set of windings via the first set of feeder cables at a control frequency with the power controller; and
   generating the current and/or voltage test signal with the power controller and supplying the test signal to the first set of windings via the first set of feeder cables;
   wherein the current and/or voltage test signal comprises one or more frequency components having a frequency that is significantly higher than the control frequency;
   wherein the method further comprises:
   measuring the voltage or current response of the current or voltage induced in the second set of windings with the detector.

* * * * *